United States Patent
Kato et al.

(10) Patent No.: US 6,186,678 B1
(45) Date of Patent: *Feb. 13, 2001

(54) FILM GUIDE STRUCTURE IN CAMERA BODY

(75) Inventors: Koji Kato, Tama; Toru Komatsu, Okaya, both of (JP)

(73) Assignee: Olympus Optical Co., Ltd. (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/225,771

(22) Filed: Jan. 5, 1999

(30) Foreign Application Priority Data

Jan. 7, 1998 (JP) .................................................. 10-001749

(51) Int. Cl.⁷ .............................. G03B 1/00; G03B 17/00
(52) U.S. Cl. ......................... 396/415; 396/440; 396/541
(58) Field of Search ................................. 396/415, 439, 396/440, 535, 541

(56) References Cited

U.S. PATENT DOCUMENTS

| 4,132,473 | * | 1/1979 | Kondo | 396/440 |
| 4,152,062 | * | 5/1979 | Kobori | 396/440 |
| 4,685,790 | * | 8/1987 | Uematsu | 396/440 |
| 5,521,668 | * | 5/1996 | Ezawa | 396/440 |
| 5,623,711 | * | 4/1997 | Misawa | 396/357 |
| 5,999,750 | * | 12/1999 | Yamada et al. | 396/176 |
| 6,023,592 | * | 2/2000 | Yokoyama et al. | 396/541 |

FOREIGN PATENT DOCUMENTS 2-259631   10/1990   (JP) .
8-160516    6/1996   (JP) .

* cited by examiner

Primary Examiner—David M. Gray
(74) Attorney, Agent, or Firm—Ostrolenk, Faber, Gerb & Soffen, LLP

(57) ABSTRACT

A camera body includes an aperture unit, having a picture-taking opening and guide rails for defining the position of a film in the direction of an optical axis with respect to the picture-taking opening, a cartridge chamber unit connectable with one end of the aperture unit, and a spool chamber unit connectable with the other end of the aperture unit. At least one of a film exit port of the cartridge chamber unit and a film entrance port of the spool chamber unit includes guide portions that define the position of a film in the direction of the width of the film that is paid out from a film cartridge.

12 Claims, 3 Drawing Sheets

FILM GUIDE STRUCTURE IN CAMERA BODY

BACKGROUND OF THE INVENTION

1. Field of the invention

The present invention relates to a camera body and, more particularly, to a camera body that performs picture taking using a photographic photosensitive film.

2. Related background art

A diversity of constructions have been proposed for the main body of a picture-taking camera (hereinafter simply referred to as a camera) that performs picture taking using a roll of photographic photosensitive film (hereinafter simply referred to as film) or other photosensitive materials.

Cameras as disclosed in Japanese Unexamined Patent Publications No. 8-160516 and Japanese Unexamined Patent Publication No. 2-259631, incorporate a unitized design in which a plurality of units, each constructed for its own function, are integrated into a unitary body in an efficient manner to form the camera body while assuring the robustness of the camera body.

Even when an external force acts on the camera body, the above design controls deformation of a guide rail and other components forming a film path within the camera and maintains the flatness of the film therein. When any change in specification is necessary, corresponding design change is carried out on a unit by unit basis. The time required for the design change is thus shortened, and a modification in the manufacturing facility is kept to a limited range.

A unit (hereinafter referred to as an aperture unit) defining a picture-taking opening (also referred to as an aperture) is provided with guide rails that project rearward by a predetermined length in a direction parallel to an optical axis and that runs in the vicinity of the upper inner edge and the lower inner edge of the unit. The guide rails and a pressure plate arranged on the rear side in the camera typically defines the position of the film loaded in the camera body in terms of the width direction of the film and the direction of the optical axis.

Such an aperture unit of this conventional camera is typically provided with a pair of first guide rails that define the position of the film in its width direction and a pair of second guide rails that are arranged within the first guide rails to define the film position in the optical axis direction, thereby assuring the flatness of the film.

A small gap or tunnel gap between the second guide rails and the pressure plate forms a film path. Since the surfaces of the guide rails forming the film path require an extremely high machining accuracy, a high-precision plastic molding process, milling operation or other technique is used to achieve the required accuracy level.

When the aperture unit is manufactured from a metal material such as aluminum or aluminum alloy, a milling cutting process is typically used to precisely machine the rail surface of the guide rails in the unit. The milling cutting process requires high manufacturing skill, thereby unavoidably pushing up the cost of production.

When the means such as the milling cutting process is used on the metal aperture unit, a bending process is also needed to assure accuracy. This means not only degrades the production efficiency but also increases the cost of production.

When the aperture unit is constructed of a plastic material as is recently in widespread use, the rail surface of the guide rails is easily formed, but the plastic member fails to meet the strength that is required of the aperture unit. There is thus a possibility that the aperture unit itself may become deformed during use or transportation, and a deformed unit may present a problem with maintaining the flatness of the film.

SUMMARY OF THE INVENTION

It is an object of the present invention to provide a camera body having a plurality of units including an aperture unit which has a simple construction to assure an easy-to-manufacture process, and assures a required strength while still contributing to a reduction in the cost of production.

According to a first aspect of the present invention, the camera body includes an aperture unit in which an aperture opening is formed, a cartridge chamber unit connectable with one end of the aperture unit, and a spool chamber unit connectable with the other end of the aperture unit, wherein at least one of a film exit port of the cartridge chamber unit and a film entrance port of the spool chamber unit includes a guide portion that defines the position of a film in the direction of width of the film that is paid out from a film cartridge.

According to a second aspect of the present invention, the camera body includes an aperture unit including an aperture opening, guide rails for defining the position of a film in the direction of an optical axis with respect to the aperture opening, projecting portions for defining the position of the film on the guide rails, a pressure plate, a cartridge chamber unit connectable with one end of the aperture unit, and a spool chamber unit connectable with the other end of the aperture unit.

According to a third aspect of the present invention, the camera body includes a generally planar aperture unit comprising an aperture opening, guide rails for defining the position of a film in the direction of an optical axis, projecting portions for defining the position of the film on the guide rails, a pressure plate, a cartridge chamber unit connectable with one end of the aperture unit, a spool chamber unit connectable with the other end of the aperture unit, and a guide portion formed on at least one of a film exit port of the cartridge chamber unit and a film entrance port of the spool chamber unit for defining the position of the film in the direction of width of the film that is paid out from a film cartridge.

According to a fourth aspect of the present invention, the camera body includes an aperture unit including at least a picture-taking opening, and a film cartridge chamber unit for housing a film cartridge, wherein the film cartridge chamber unit includes a guide portion for restraining the position of a film in the direction of the width of the film.

Furthermore, the camera body may include an aperture unit including at least a picture-taking opening, and a spool chamber unit for housing a film paid out of a film cartridge, wherein the spool chamber unit includes a guide portion for restraining the position of a film in the direction of the width of the film.

These and other objects and advantages will become more apparent when the following detailed description of the present invention is considered.

The present invention thus provides a camera body having a plurality of units including an aperture unit having a simple construction to assure an easy-to-produce process, and assures a required strength while still contributing to a reduction in the cost of production.

DETAILED DESCRIPTION OF THE PREFERRED EMBODIMENTS

Figure 1:
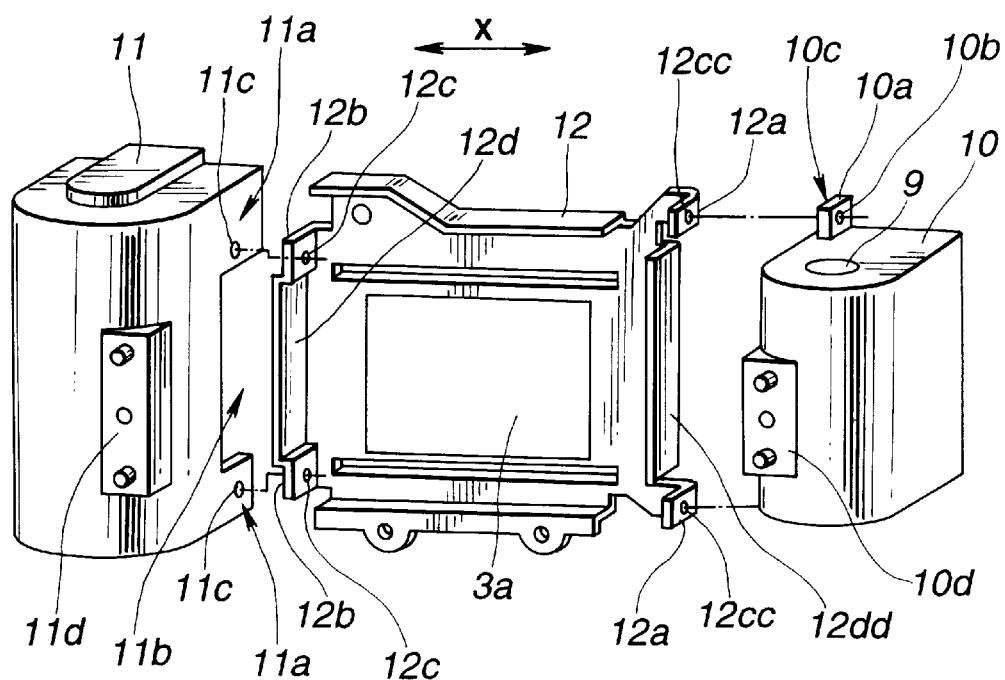
FIG. 1 is an exploded perspective front side view showing a disassembled aperture unit, spool chamber unit and cartridge chamber unit among a plurality of units forming a camera body of one embodiment of the present invention.

The camera body of one embodiment of the present invention is constructed of a plurality of units, including a spool chamber unit 10 forming a spool chamber within which a spool 9 for rolling an exposed film is rotatably supported, a cartridge chamber unit 11 forming a cartridge chamber and which is loaded with a film cartridge 18 (see FIG. 4) in which a roll of unexposed, photosensitive film is housed, an aperture unit 12 which is a generally planar connection member having a picture-taking opening 3a, a guide rail 12e and the like for connecting units such as the spool chamber unit 10 and the cartridge chamber unit 11, a lens barrel unit (not shown) arranged in front of the aperture unit 12 and housing an imaging lens and other components therewithin, a connection reinforcement member (not shown) for reinforcing the connection of units to the camera body from the front, and a lower connection member (not shown) for reinforcing the connection of units to the camera body from below.

The construction of the aperture unit 12, spool chamber unit 10 and cartridge chamber unit 11 among a plurality of units constituting the camera body of this embodiment is discussed below. Also discussed will be the connection means for mutually connecting the units.

Figure 3:
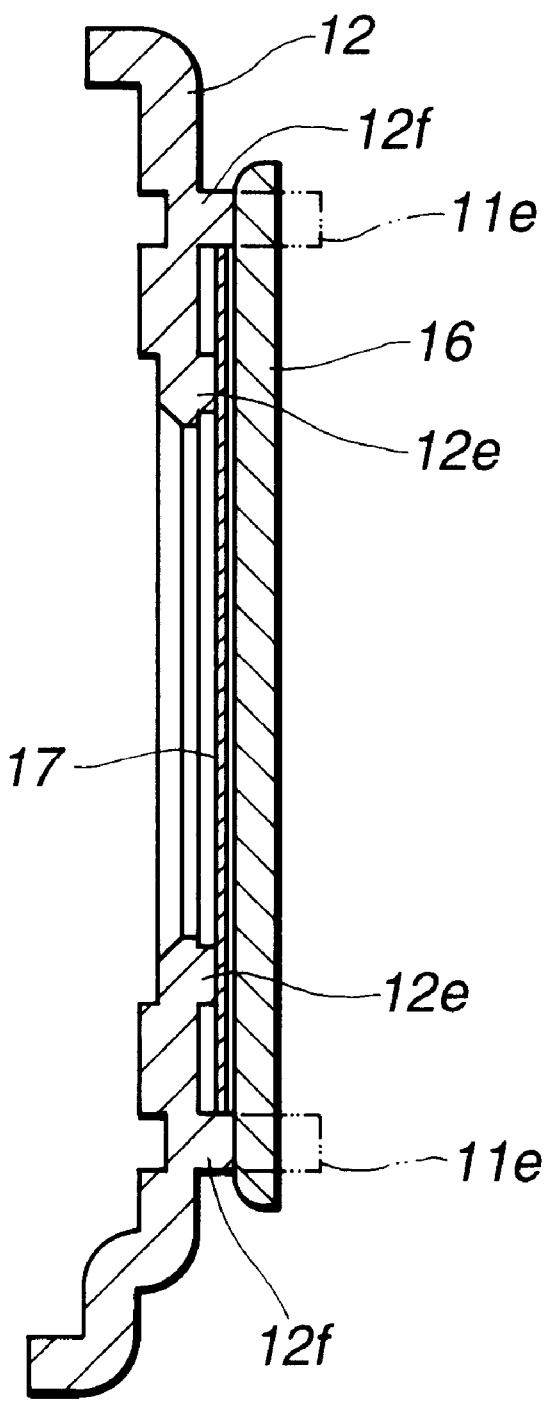
FIG. 3 is a vertical cross sectional view showing pressure-plate supports and their associated components in the aperture unit shown in FIG. 1.

The aperture unit 12 is manufactured of aluminum or an aluminum alloy, for example, and has the generally centrally arranged picture-taking opening 3a, and guide rails 12e which are elongated projections arranged on the rear side thereof. The picture-taking opening 3a defines the frame that permits a luminous flux from the lens barrel unit to pass therethrough. Along with a pressure plate 16 (see FIG. 3) arranged on a rear cover (not shown), the guide rails 12e press against both edges of the film to assure the flatness of the film and to define the position of the film in the direction of the optical axis, with respect to the picture-taking opening 3a.

The cartridge chamber unit 11 is manufactured from a plastic material, for example, and is a partly cut, generally cylindrical member with its top and bottom closed so that it can be loaded with the film cartridge 18. The cartridge chamber unit 11 has, on its inner side wall, a vertically running cutout portion 11b slightly offset from the center thereof, with which a connection portion 12d of the aperture unit 12 is engaged. Two screw holes 11c are respectively formed in the cartridge chamber unit 11 near the top edge and bottom edge of the cutout portion 11b to connect the cartridge chamber unit 11 to the aperture unit 12, correspondingly the aperture unit 12 has two through-holes 12c at locations facing the two screw holes 11c.

The end of the aperture unit 12 facing the cartridge chamber unit 11 has a bent portion having an abutment surface 12b that is interfaced with the cartridge chamber unit 11, has two through-holes 12c drilled in the abutment surface 12b, and the connection portion 12d that is a step projecting externally from the abutment surface 12b. The bent portion is aligned in parallel with the direction of the optical axis of the imaging lens (not shown) and is perpendicular to a film advance direction X (see FIG. 1 and FIG. 2).

When the connection portion 12d of the aperture unit 12 is interfaced with the cutout portion 11b of the cartridge chamber unit 11, an abutment surface 11a having the screw holes 11c is interfaced with the abutment surface 12b having the through-holes 12c with the two screw holes 11c respectively aligned with the two through-holes 12b. With both units held in this position, screws are driven from the aperture unit 12 to secure the cartridge chamber unit 11 to the one end of the aperture unit 12.

Figure 2:
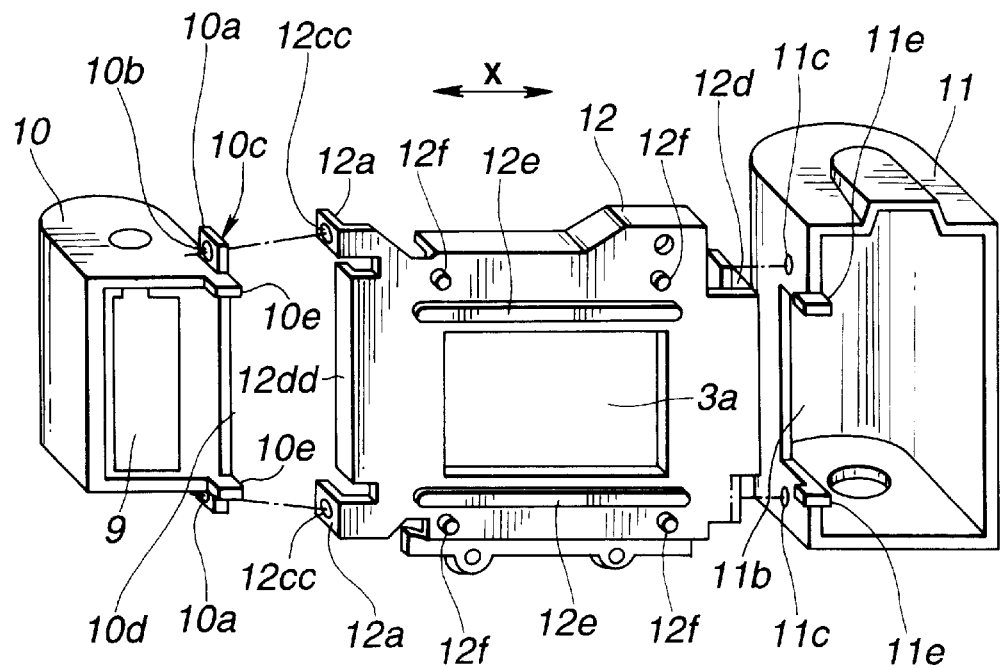
FIG. 2 is an exploded perspective rear side view showing the disassembled aperture unit, spool chamber unit and cartridge chamber unit forming the camera body shown in FIG. 1.

The bent portion of the aperture unit 12 having the abutment surface 12b and connection portion 12d is aligned in parallel with the direction of the optical axis of the imaging lens (not shown) and is perpendicular to the film advance direction X (see FIG. 1 and FIG. 2). The cartridge chamber unit 11 is also aligned in parallel with the direction of the optical axis of the imaging lens and perpendicular to the film advance direction X.

Like the cartridge chamber unit 11, the spool chamber unit 10 is manufactured from a plastic material, for example, and is a partly cut, generally cylindrical member with its top and bottom closed, and rotatably supports therewithin the spool 9 that rolls the film paid out of the film cartridge 18 loaded in the cartridge chamber.

The spool chamber unit 10 has on its top and bottom sides respective lugs 10a, each having a screw hole 10b for connecting the spool chamber unit 10 to the aperture unit 12. The abutment surface 10c of the lug 10a is arranged facing the aperture unit 12.

Respectively provided on the top and bottom ends of the aperture unit 12 facing the spool chamber unit 10 are first bent portions 12a, each having an abutment surface to be engaged with the respective abutment surface 10c of the lug 10a of the spool chamber unit 10. Each first bent portion 12a has its respective through-hole 12cc. A second bent portion 12dd bent frontward is formed between the first two bent portions 12a.

The other end of the aperture unit 12 is thus bent frontward so that the first bent portions 12a and second bent portion 12dd are aligned in parallel with the optical axis of the imaging lens (not shown) and perpendicular to the film advance direction X (see FIG. 1 and FIG. 2). When the second bent portion 12dd of the aperture unit 12 is engaged with a cutout 10d (see FIG. 2) of the spool chamber unit 10, the abutment surfaces 10c of the lugs 10a are interfaced to the abutment surfaces of the first bent portions 12a of the aperture unit 12 with the screw holes 10b of the two lugs 10a respectively aligned with the through-holes 12cc. With both units held in this position, screws are driven from the aperture unit 12 to secure the spool chamber unit 10 to the other end of the aperture unit 12.

As described above, the abutment surfaces of the first bent portions 12a and the second bent portion 12dd of the aperture unit 12 are aligned in parallel with the optical axis of the imaging lens (not shown) and in perpendicular to the film advance direction X (see FIG. 1 and FIG. 2), and, like the cartridge chamber unit 11 the spool chamber unit 10 is aligned in parallel with the optical axis of the image lens and perpendicular to the film advance direction X (see FIG. 1 and FIG. 2).

The spool chamber unit 10 and the cartridge chamber unit 11 have respective connection portions 10d and 11d (see FIG. 1) on their front sides at approximately mid-height positions close to the aperture unit 12, and each of the connection portions 10d and 11d is provided with two projections and one connection hole. The abutment surface of each connection reinforcement member (not shown) facing the two projections and one connection hole has two connection holes and one projection. The connection reinforcement members are thus connected to the spool chamber unit 10 and cartridge chamber unit 11 through these projections and holes.

Arranged near the four corners of the aperture unit 12 on its rear side are four pressure-plate supports 12f of a cylindrical projection, two on the upper periphery and two on the lower periphery of the picture-taking opening 3a so that the four pressure-plate supports 12f are in contact with the film path. The pressure-plate supports 12f, along with the guide rails 12e, is produced in a half-cut manner by a press working, process and serves the purpose of defining the position of the film in its width direction on the guide rails 12e.

Although the guide rails 12e and the pressure-plate supports 12f are all projections extending rearward (see FIG. 3), the projection length of the guide rails 12e is slightly shorter than the projection length of the pressure-plate supports 12f, causing a step therebetween.

Figure 4:
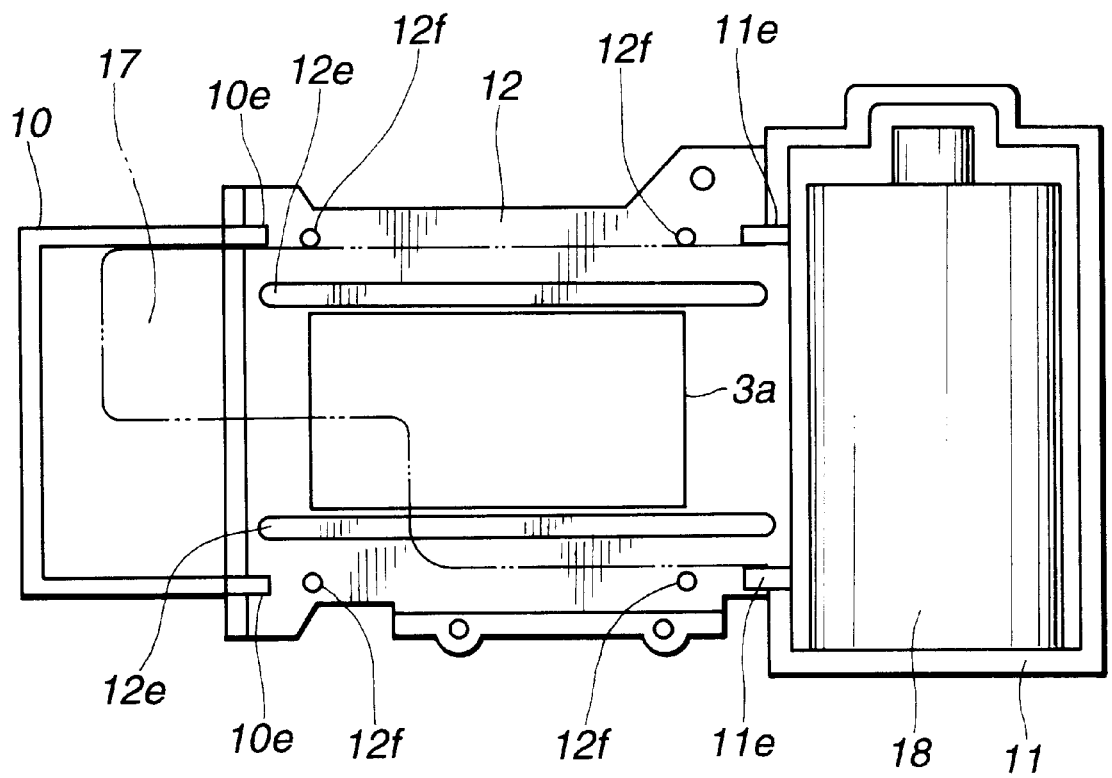
FIG. 4 is a rear view showing the aperture unit, spool chamber unit, and cartridge chamber unit forming the camera body shown in FIG. 1, wherein the forward end of a film is pulled out from a cartridge loaded in a cartridge chamber.

Referring to FIG. 2 and FIG. 4, the spool chamber unit 10 and cartridge chamber unit 11, on their respective film entrance and exit ports, are respectively provided with projecting guide portions 10e and 11e that define the position of the film in the direction of its width. The guide portions 10e and 11e correspond to the first guide rails in the conventional camera, and define the position of the film in its width direction on the guide rails 12e. The guide portions 10e and 11e are arranged in a line with the two pressure-plate supports 12f on the upper periphery of the picture-taking opening 3a and in a line with the two pressure-plate supports 12f on the lower periphery of the picture-taking opening 3a, such that the spacing between the upper and lower guide portions 10e and 11e is approximately equal to the width dimension of the film.

The units thus constructed are connected to assemble the camera body of this embodiment.

As shown in FIG. 4, the cartridge chamber of the cartridge chamber unit 11 is loaded with a film cartridge, the forward end of the film 17 is pulled out of the film cartridge, the forward end is inserted into the spool chamber of the spool chamber unit 10 as represented by a broken line with two dots in FIG. 4, and the camera rear cover (not shown) is closed. In this state, the outermost side edges of the film 17 are in contact with the guide portions 10e and 11e and the pressure-plate supports 12f, and the film 17 is thus properly positioned in the width direction.

The side edges of the film 17 are held in the film path that is formed in a small gap or tunnel gap between the pressure plate 16 (see FIG. 3) arranged on the inner wall of the rear cover and the guide rails 12e.

According to the above embodiment, the pressure-plate supports 12f are formed of a cylindrical projection, and a sufficiently accurate accuracy level is attained by subjecting the pressure-plate supports 12f to simple press working.

Since the guide portions 10e and 11e for defining the position of the film 17 in the width direction within the film path are arranged on units, different from the aperture unit 12, specifically, on the film entrance and exit ports of the spool chamber unit 10 and cartridge chamber unit 11 respectively the construction of the aperture unit 12 is simplified. This arrangement eliminates manufacturing steps conventionally performed on the aperture unit 12, contributing to improvements in the productivity of the camera and reduction in the cost of production.

The camera body is assembled by connecting a plurality of units. When any change in specification is made, a corresponding design change is carried out on a unit by unit basis. The design change is thus easy, contributing to improvements in efficiency of design and productivity.

In this embodiment, the guide portions 10e and 11e for defining the position of the film in the direction of the width of the film paid out from the film cartridge are arranged on the film entrance and exit ports of the spool chamber unit 10 and cartridge chamber unit 11, respectively. The present invention is not limited to this arrangement.

Any guide portions 10e and 11e are acceptable as long as they reliably define the film position in its width direction upon being paid out of the film cartridge. For example, the same advantage is offered by arranging a guide portion on either the film exit port of the cartridge chamber unit 11 or the film entrance port of the spool chamber unit 10. It is thus acceptable that the guide portions (10e, 11e) are arranged on at least one of the film exit port of the cartridge chamber unit 11 and the film entrance port of the spool chamber unit 10.

In this invention, it is apparent that a variety of different working modes can be formed on this basis of this disclosure without departing from the spirit and scope of the invention. This invention is therefore not restricted by any specific embodiment disclosed herein except being limited by the appended claims.

What is claimed is:

1. A camera body comprising:
   an aperture unit in which an aperture opening is formed;
   a separate cartridge chamber unit connectable with one end of said aperture unit and including a film exit port; and
   a separate spool chamber unit connectable with the other end of said aperture unit and including a film entrance port,
   wherein at least one of said film exit port of said cartridge chamber unit and said film entrance port of said spool chamber unit includes a guide portion that defines a position of a film in a width direction of said film that is paid out from a film cartridge loaded into said cartridge chamber and also defines a position of said spool chamber unit relative to said aperture unit when they are connected with each other.

2. A camera body according to claim 1, wherein said aperture unit comprises guide rails that define the position of said film in the direction of an optical axis with respect to said aperture opening so that the position of said film is defined by said guide portions and said guide rails.

3. A camera body according to claim 2, further comprising a pressure plate; and
   projecting portions on opposing sides of the aperture opening with said guide rails interposed between said protecting portions for defining the position of said film on said guide rails and along said pressure plate so that the position of said film is defined by said guide portions, said guide rails and said projecting portions.

4. A camera body according to claim 3, wherein said aperture unit is made from aluminum or an aluminum alloy, and wherein at least said projecting portions are formed by press working.

5. A camera body comprising:

a pressure plate;

a separate generally planar aperture unit including an aperture opening, guide rails for defining the position of a film in the direction of an optical axis, and projecting portions for engaging with said pressure plate to define the position of said film on said guide rails;

a separate cartridge chamber unit connectable with one end of said aperture unit and including a film exit port;

a separate spool chamber unit connectable with the other end of said aperture unit and including a film entrance port; and a guide portion formed on at least one of said film exit port of said cartridge chamber unit and said film entrance port of said spool chamber unit for defining the position of said film in a width direction of said film that is paid out from a film cartridge loaded into said cartridge chamber unit and also defines a position of said spool chamber unit or said cartridge chamber unit relative to said aperture unit.

6. A camera body according to claim 5, wherein said aperture unit only is manufactured of a metallic material.

7. A camera body according to claim 6, wherein the material of said aperture unit is aluminum or an aluminum alloy.

8. A camera body according to claim 5, wherein said projecting portions of said aperture unit are arranged in the vicinity of at least each of four corners of said aperture opening.

9. A camera body according to claim 6, wherein said projecting portions of said aperture unit are formed by press working.

10. A camera body according to claim 5, wherein said projecting portions of said aperture unit are cylindrical, and wherein the surface of said projecting portions engaging with said pressure plate are arranged to be perpendicular to the optical axis.

11. A camera comprising:

an aperture unit including at least a picture-taking opening; and a separate film cartridge chamber unit connectable with one end of the aperture unit for housing a film cartridge, wherein said film cartridge chamber unit includes a guide portion for restraining the position of a film in a width direction of said film that is paid out from said film cartridge and also defining a position of said film cartridge chamber unit relative to said aperture unit.

12. A camera comprising:

an aperture unit comprising at least a picture-taking opening; and a separate spool chamber unit connectable with one end of the aperture unit for housing a film pulled out of a film cartridge, wherein said spool chamber unit includes a guide portion for restraining the position of a film in a width direction of said film that is paid out from said film cartridge and also defining a position of said spool chamber unit relative to said aperture unit.

* * * * *